United States Patent [19]

Dang et al.

[11] Patent Number: 5,778,374

[45] Date of Patent: Jul. 7, 1998

[54] COMPRESSED COMMON FILE DIRECTORY FOR MASS STORAGE SYSTEMS

[75] Inventors: Chi-Hung Dang; Chi-Thanh Dang, both of Tucson, Ariz.

[73] Assignee: International Business Machines Corporation, Armonk, N.Y.

[21] Appl. No.: 510,995

[22] Filed: Aug. 3, 1995

[51] Int. Cl.⁶ .................................................. G06F 17/30
[52] U.S. Cl. .................... 707/101; 345/971; 395/898; 364/715.02; 707/200; 707/201; 707/202; 707/203; 707/204; 707/205; 707/206
[58] Field of Search ................... 395/601, 602, 395/610, 616, 621, 200.09, 898; 707/101, 200–206; 345/971; 364/715.02

[56] References Cited

U.S. PATENT DOCUMENTS

| | | | |
|---|---|---|---|
| 4,152,764 | 5/1979 | Connors et al. | 364/200 |
| 4,575,827 | 3/1986 | Kulakowski | 365/230 |
| 4,672,539 | 6/1987 | Goertzel | 364/300 |
| 4,884,199 | 11/1989 | Boothroyd et al. | 364/408 |
| 5,060,090 | 10/1991 | Kobayashi et al. | 360/71 |
| 5,129,076 | 7/1992 | Freeman et al. | 395/425 |
| 5,155,835 | 10/1992 | Belsan | 395/425 |
| 5,197,055 | 3/1993 | Hartung et al. | 369/34 |
| 5,204,756 | 4/1993 | Chevion et al. | 358/426 |
| 5,212,786 | 5/1993 | Sathi | 395/600 |
| 5,239,647 | 8/1993 | Anglin et al. | 395/600 |
| 5,239,650 | 8/1993 | Hartung et al. | 395/650 |
| 5,287,459 | 2/1994 | Gniewek | 395/275 |
| 5,289,589 | 2/1994 | Bingham et al. | 395/425 |
| 5,305,295 | 4/1994 | Chu | 369/30 |
| 5,317,328 | 5/1994 | Tevis et al. | 395/600 |
| 5,333,313 | 7/1994 | Heising | 395/601 |
| 5,388,260 | 2/1995 | Monahan et al. | 395/600 |
| 5,394,534 | 2/1995 | Kulakowski et al. | 395/425 |
| 5,394,537 | 2/1995 | Courts et al. | 395/425 |
| 5,473,761 | 12/1995 | Parks et al. | 395/404 |
| 5,504,873 | 4/1996 | Martin et al. | 395/438 |
| 5,546,557 | 8/1996 | Allen et al. | 395/438 |
| 5,551,020 | 8/1996 | Flax et al. | 395/600 |
| 5,572,422 | 11/1996 | Nematbakhsh et al. | 395/203 |
| 5,590,317 | 12/1996 | Iguchi et al. | 395/602 |
| 5,596,736 | 1/1997 | Kerns | 395/404 |

*Primary Examiner*—Thomas G. Black
*Assistant Examiner*—Jean M. Corriélus
*Attorney, Agent, or Firm*—Baker Maxham Jester & Meador

[57] ABSTRACT

A file management system for accessing mass storage systems, employing a compressed common file directory ("CCFD") that occupies a minimum amount of storage space. The CCFD is implemented in a storage system including a library of media, one or more storage drives that may be permanently or selectively coupled to the media, and a controller connected. Each piece of media includes a local file directory, which contains a listing of the files stored on that piece of media cross-referenced to those files' addresses on the media item. The controller contains or has convenient access to the CCFD. When access to a file is desired, the CCFD is used to quickly identify the piece of media containing that file. More particularly, the CCFD includes a first data structure including a list of encoded filenames cross-referenced to a list oil compressed media IDs. Each encoded filename comprises a filename of a file stored in one or more of the media, encoded with a selected encoding scheme. For each encoded filename, the associated compressed media ID comprises an encoded name of a piece of media containing that file. A second data structure includes a list of each compressed media ID cross-referenced to a media location identifier specifying the location of that media item in the library. To access a desired file stored in the library, the file's name is first encoded. Then, the encoded filename is cross-referenced in the first data structure to obtain a compressed media ID. Using the second data structure, the compressed media ID is used to determine the media's location identifier. The media location identifier is then used to locate the media containing the file. After the media is located and obtained, the media's local file directory is searched to find the desired file's address in that piece of media.

36 Claims, 9 Drawing Sheets

5,778,374

COMPRESSED COMMON FILE DIRECTORY FOR MASS STORAGE SYSTEMS

BACKGROUND OF THE INVENTION

1. Field of the Invention

The present invention relates to the storage of machine-readable files in a library of storage devices. More particularly, the invention concerns a file management system employing a file directory that has been structured to occupy a minimum amount of storage space.

2. Description of the Related Art

In mass storage devices such as optical or magnetic tape libraries, a single piece of media can store many files. Furthermore, library type storage systems may include thousands of pieces of media. Accordingly, an entire storage system may easily contain tens or hundreds of thousands of files. Engineers have therefore developed a number of different ways to quickly locate stored files.

In one arrangement (FIG. 1), multiple pieces of media 100 are connected to a common controller 102. Each piece of media 100 includes its own reader, which is connected to the common controller 102. For instance, the media item 104 is coupled to a reader 106. Each piece of media also includes a local file directory, which lists the memory addresses for all files stored on the medium. For instance, the medium 104 includes the local file directory 108. This system may also incorporate a common sub-volume directory 110 (sometimes called a volume table of contents, or "VTOC"), which provides a directory of all files stored in a "sub-volume" (not shown) of multiple pieces of media including the piece of media 104.

The arrangement of FIG. 1 may be used, for example, in a hard disk drive. It is able to locate data quickly, because the readers may be operated simultaneously to search the local file directories of their respective pieces of media. This system may be too costly for some users, however, since multiple, parallel readers are required.

FIG. 2 depicts a different configuration, which uses a shared reader 200 in conjunction with multiple pieces of media 202. The reader 200 is operated by a controller 201. In this system, any of the pieces of media 202 may be accessed by individually loading it to the shared reader 200. Each piece of media includes its own local file directory, as shown by the media item 204 and local file directory 206.

For the controller 201 to locate a random file, the pieces of media 202 can be sequentially loaded and each local file directory (e.g. 206) searched until the desired piece of media is found. This simple approach may be excessively time consuming if the library contains hundreds or thousands of pieces of media.

To avoid loading every piece of media, engineers have developed a "common file directory" 208 that includes information pertaining to all pieces of media. The common file directory 208 contains a listing of all files stored in the library, cross-referencing each file to the specific piece of media containing that file. Typically, the common file directory 208 lists each file by showing the file's "header." A file's header usually includes certain information such as the file's size, date of most recent update, an extended attribute list, and other useful statistics or labels. This information is not only well known to those in the art, but certain types of file headers are presently defined by ANSI standards.

The common file directory 208 is stored in direct access storage 209 accessible by the controller 201. For some users, this approach may be somewhat limited, because the common file directory 208 can occupy a substantially amount of memory. The typical file header occupies 2 Kbytes of storage space. In a system with 100,000 files, the common file directory 208 therefore occupies 2 Gigabytes.

FIG. 3 illustrates a variation on the common file directory approach. The storage system of FIG. 3 also uses a shared reader 300, a controller 301, and multiple pieces of media 302. As in FIG. 2, each piece of media 302 includes its own local file directory, as shown by the item of media 304 and local file directory 306.

However, rather than storing the lengthy common file directory 208, the controller 301 uses a "common sub-volume directory" 308. The common sub-volume directory 308 is stored in direct access storage 309 accessible by the controller 201. Frequently, storage systems divide their storage space into multiple sub-volumes, where each sub-volume contains multiple files and corresponds to one or more pieces of media. The sub-volume directory 308 lists the starting addresses of each sub-volume of the system.

For the controller 301 to locate a random file in this system, the controller 301 must know in advance which sub-volume the file exists in. As a result, the system requires additional overhead, which may not be desirable for some users.

SUMMARY OF THE INVENTION

Broadly, the present invention concerns a file management system for accessing mass storage systems, employing a compressed common file directory ("CCFD") that occupies a minimum amount of storage space. The CCFD is implemented in a storage system including a media library, one or more readers that may be permanently or selectively coupled to the media, and a controller connected to the reader(s). Each piece of media includes a local file directory, which contains a listing of the files stored on that piece of media, cross-referenced to those files' addresses on the media. The controller contains or has convenient access to the CCFD. When access to a file is desired, the CCFD is used to quickly identify the piece of media containing that file.

More particularly, the CCFD includes a first data structure including a list of encoded filenames, cross-referenced to a list of compressed media IDs. Each encoded filename comprises a filename of a file stored in the media, encoded with a selected encoding scheme. Each compressed media ID comprises an encoded name of a piece of media that contains the file identified by the cross-referenced encoded filename. A second data structure includes a list of each compressed media ID cross-referenced to a media location identifier that indicates the media item's location in the library.

To access a desired file stored in the library, the file's name is first encoded. Then, the encoded filename is cross-referenced in the first data structure to obtain a compressed media ID. Using the second data structure, the compressed media ID is used to determine a media location identifier. The media location identifier is then used to obtain the item of media containing the file. After the media item is obtained, the media item's local file directory is searched to obtain the desired file's address on that piece of media.

The invention affords its users with a number of distinct advantages. Generally, the invention provides a common file directory with significantly reduced storage size. As a result, the file directory can still be stored in storage space that is limited or expensive. Furthermore, the CCFD of the invention provides a means for speedily and directly locating files, even in a mass storage library with a thousands of storage devices and millions of files. The storage system of the invention easily accommodates random storage of files, since each sub-volume is not constrained to a predetermined size or number of files.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Figure 1:
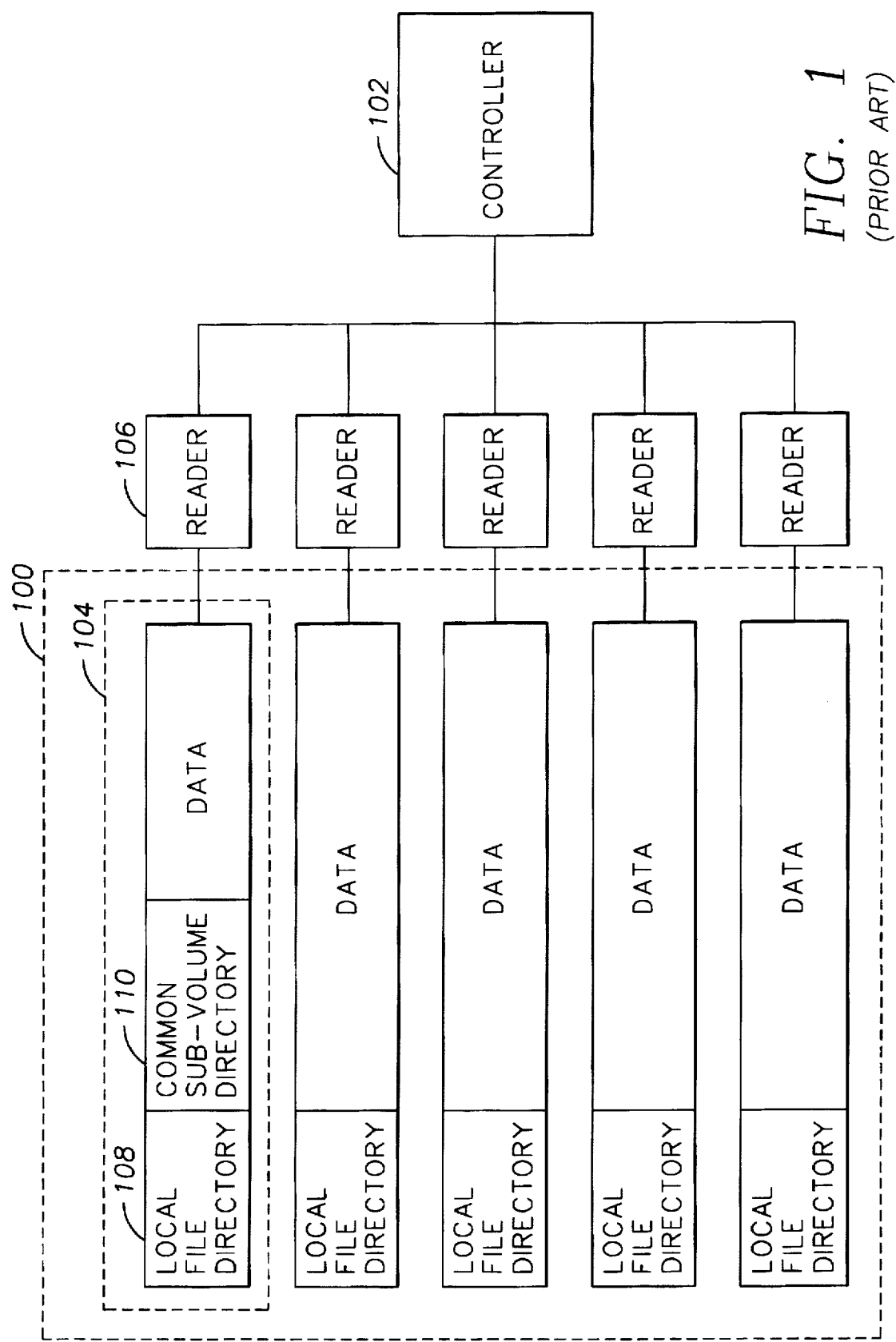
FIG. 1 is a block diagram of a known storage system with multiple pieces of media and a corresponding number of readers.
Figure 2:
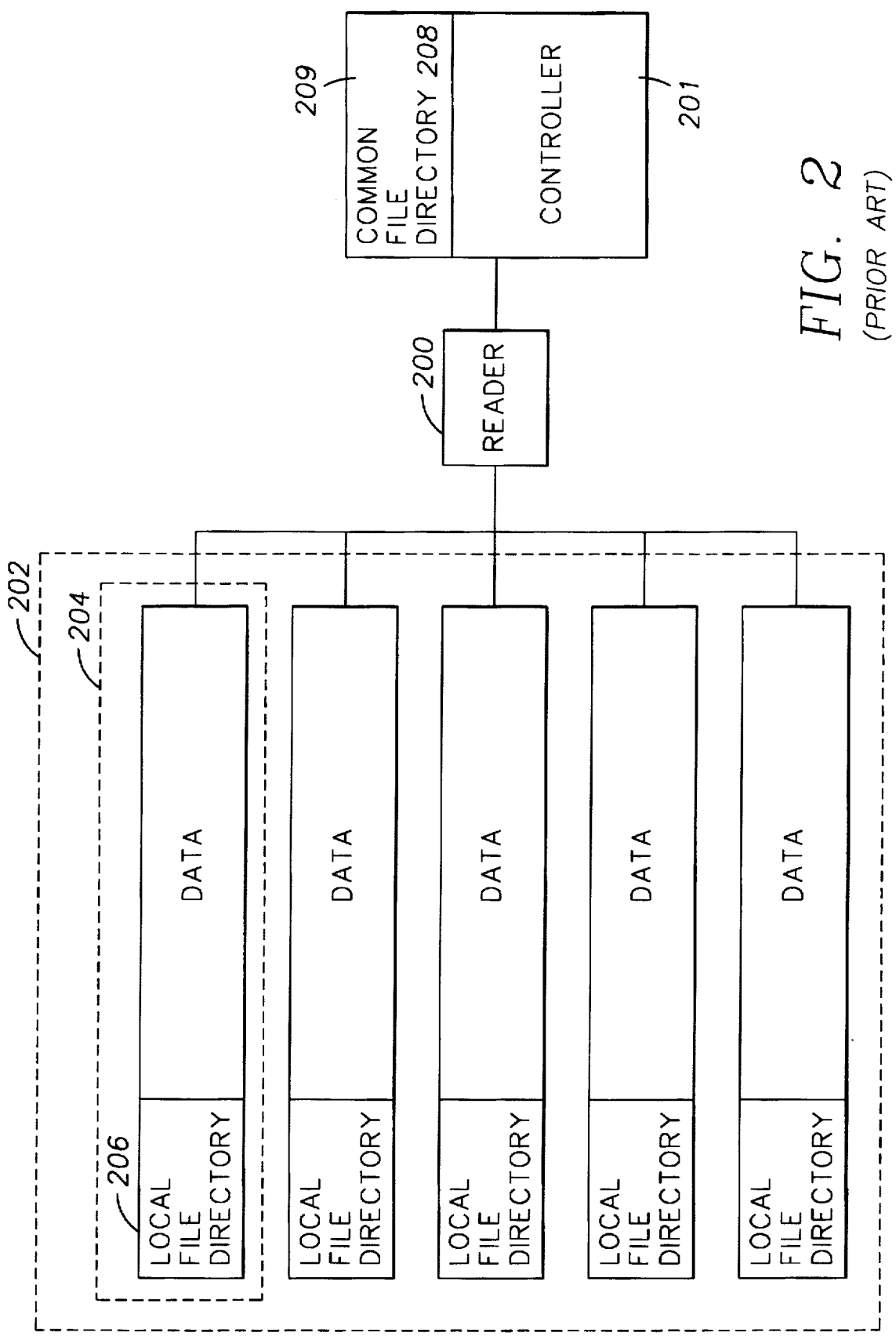
FIG. 2 is a block diagram of a known storage system with multiple pieces of media and a shared reader, employing a common file directory.
Figure 3:
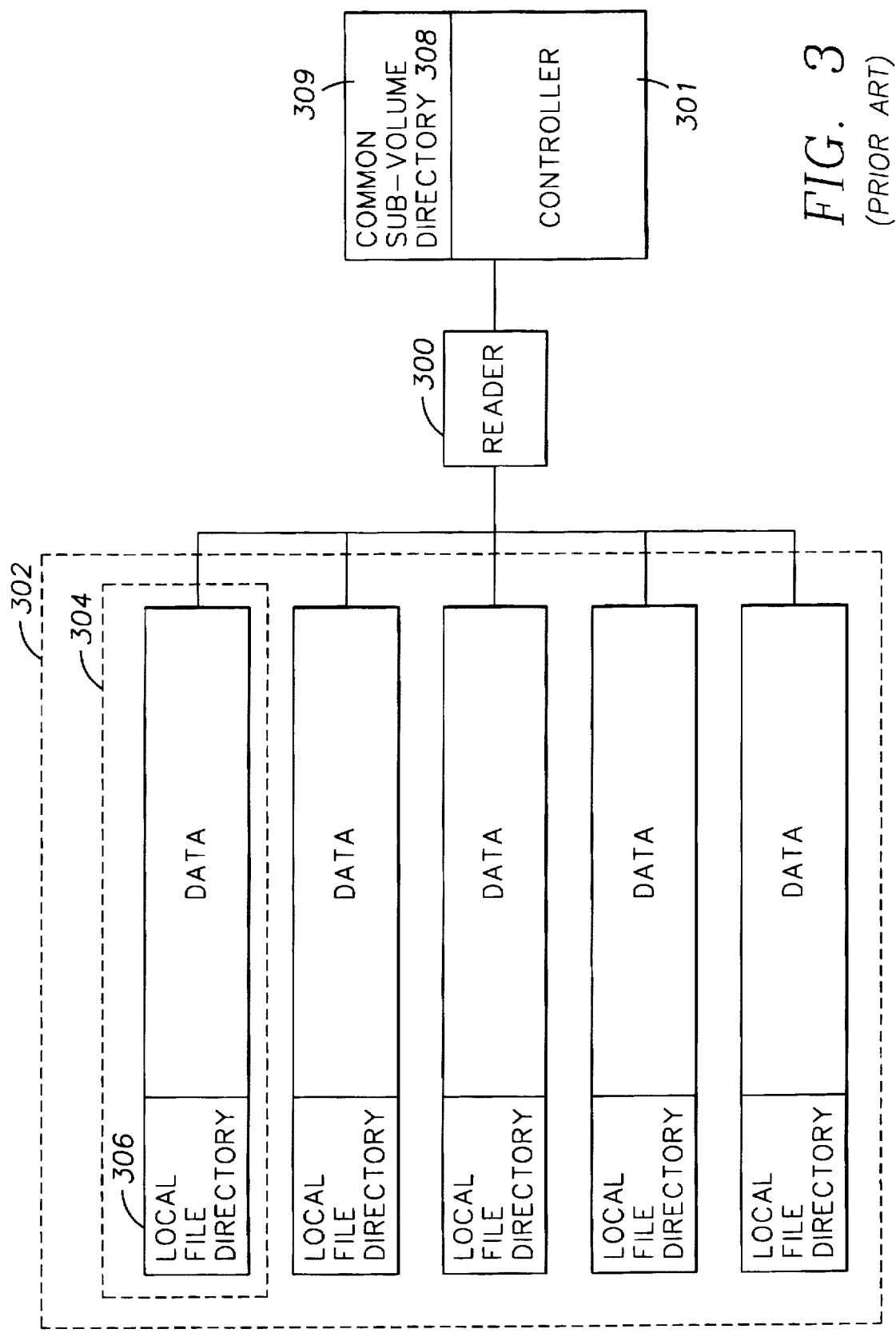
FIG. 3 is a block diagram of a known storage system with multiple pieces of media and a shared reader, employing a common sub-volume directory.

Broadly, the present invention concerns a file management system employing a CCFD whose structure and compressed size provide especially speedy and efficient access to files stored in a mass storage library. In a first embodiment, the CCFD is stored in a storage location that is directly accessible by the controller, such as a disk storage device. In a second embodiment, the CCFD is stored in the mass storage library itself, and temporarily loaded into fast-access memory accessible by the controller.

STRUCTURE

In the first embodiment, the CCFD is preferably implemented in a hardware environment such as the storage system 400. The storage system 400 includes multiple pieces of media 402 contained in a storage library (not shown). Each piece of media 402 may comprise, for example, an optical disk, a magnetic disk, a magnetic tape, or another memory storage device.

Each piece of media 402 includes a local file directory. For instance, the piece of media 404 includes a local file directory contained in a storage location 406. The local file directory provides a list of files stored on the piece of media 404, cross-referenced to the files' addresses. Each local file directory of each piece of media may include additional data for each file stored on that piece of media, such as the file types, file sizes, file positions, file protection status, usage count, date, and process identification. The piece of media 404 also includes data, contained in a storage location 407.

The system 400 also includes a shared storage drive 408, which comprises an appropriate hardware device to read and write to/from the media 402. To convey pieces of media 402 to the drive 408, the system 400 may include a conveyor (not shown). As an example, the conveyor may comprise: (1) mechanical linkage to move a read/write head from magnetic disk to magnetic disk, (2) a picker, such as a robotic arm, to grab an optical cartridge from a library and insert the optical cartridge into an optical drive, or (3) another suitable hardware device.

The reader 408 is coupled to a controller 410, which generally serves to receive read/write requests from a host 411, and execute the requests upon the media 402. More specifically, the controller 410 manages the exchange of media 402 between the storage library and the drive 408; the controller 410 also manages the drive's reading/writing of data to/from the media 402. Many different models of data management controller are known in the art. The controller 410 may, for example, comprise a hardware device such as a microprocessor.

In the first embodiment (FIG. 4), the controller 410 includes a data storage device 412 to store information helpful to manage the media 402. Preferably, the device 412 comprises a writable direct access storage device such as a magnetic or optical disk. In accordance with the present invention, the device 412 contains a CCFD 414 to provide especially fast and efficient access to files stored in the media 402. The storage device 412 may also include a buffer 416, discussed in greater detail below.

Figure 5:
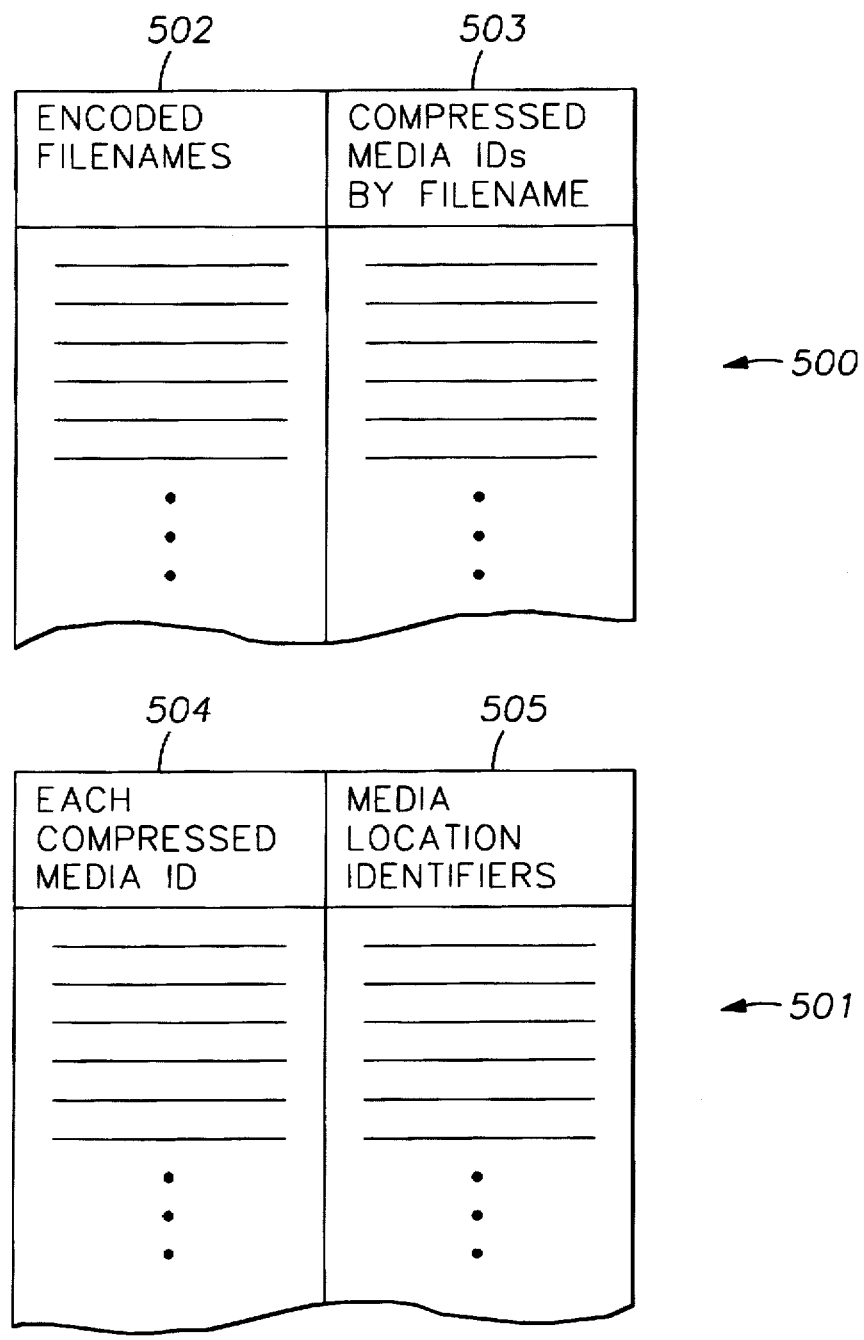
FIG. 5 is a diagram of two tables embodying a CCFD in accordance with the invention.

In a general sense, the host 411 submits requests to the controller 410 for access to files stored on the media 402. When the host 411 requests access to a file, the CCFD 414 is used to quickly identify the piece of media 402 containing that file. Referring to FIG. 5, the CCFD 414 preferably comprises first and second data structures 500-501, such as lookup tables. The first data structure 500 includes an encoded-filenames column 502 and a compressed-media-IDs-by-filename column 503. The encoded-filenames column 502 contains a listing of filenames of all files stored in the media 402, each filename being encoded to provide a unique encoded filename. Preferably, the method of encoding comprises a method of coding that provides, for each uncoded input, a coded output that is unique with respect to coded outputs of other uncoded inputs. One example of such a scheme is cyclic redundancy coding ("CRC"), which is well known in the art.

The compressed-media-IDs-by-filename column 503 contains a listing of compressed media IDs corresponding to the filenames encoded in the adjacent encoded-filenames column 502. In a given row of the data structure 500, the compressed media ID comprises a compressed code uniquely identifying the piece of media containing the file identified in the encoded-filenames column 502 of that same row. Each compressed media ID may comprise, for example, an encoding of a unique name assigned to a particular piece of media. Preferably, this encoding is also performed with CRC.

The second data structure 501 includes an each-compressed-media-ID column 504 and a media-location-identifiers column 505. The data structure 501 functions to correlate each compressed media ID to a specific item of media 402 in the library. The each-compressed-media-ID column 504 includes a single listing of each compressed media ID. The media-location-identifiers column 505 contains a list of location identifiers, providing the location (e.g., address) of each piece of media 402 in the library. In a given row of the data structure 501, the media location identifier comprises a code uniquely identifying the location of the 90 particular piece of media identified in the each-compressed-media-ID column 504 of that same row.

Preferably, the entries of the media-location-identifiers column 505 comprise numeric codes. Likewise, the encoded filenames and compressed media IDs comprise numerical entries, where CRC is used as the encoding scheme. Thus, both data structures 500–501 are completely made up of numerical entries. This has the beneficial effect of reducing time required to search the CCFD 414, since time-consuming operations such as "string compare" are unnecessary.

Referring back to FIG. 4, where the device 412 includes a buffer 416, the buffer 416 is used to temporarily store changes to the CCFD 414 and occasionally update the changes to the CCFD 414. This helps minimize access to the CCFD 414, so that the CCFD 414 is more available to locate files. As an alternative, the buffer 416 may be implemented in a separate storage device, such as a RAM buffer.

As a further enhancement to the system 400, one or more pieces of media 418 may be provided to store a complete (i.e., un-compressed) common file directory ("un-CCFD") 417. The un-CCFD 417 may be used to replace the CCFD 414 in an emergency, or to help reconstruct damaged or lost portions of the CCFD 414. It also provides a common directory that contains a complete file listing, for use in operations such as file listing, grouping, sorting, etc. The un-CCFD 417 may be stored, for example, in a piece of media 418. With this enhancement, the storage device 412 preferably includes a buffer 419 to temporarily store changes to the un-CCFD 417, which are occasionally updated to the un-CCFD 417. The buffer 419 may of course be implemented in a separate device, such as a RAM buffer, instead.

Figure 4:
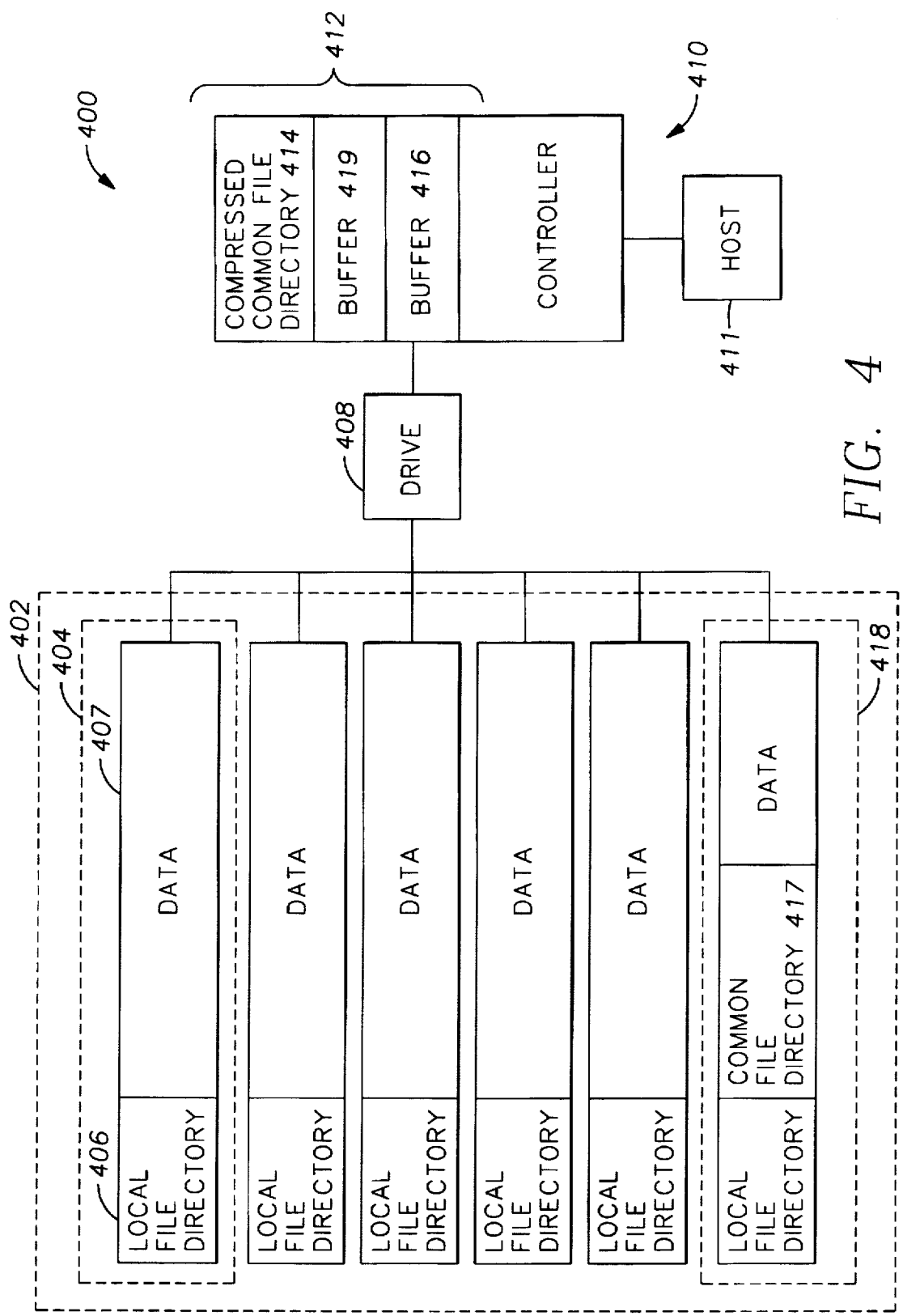
FIG. 4 is a block diagram of a first embodiment of storage system pursuant to the invention, where a controller has ongoing direct access to a CCFD.
Figure 6:
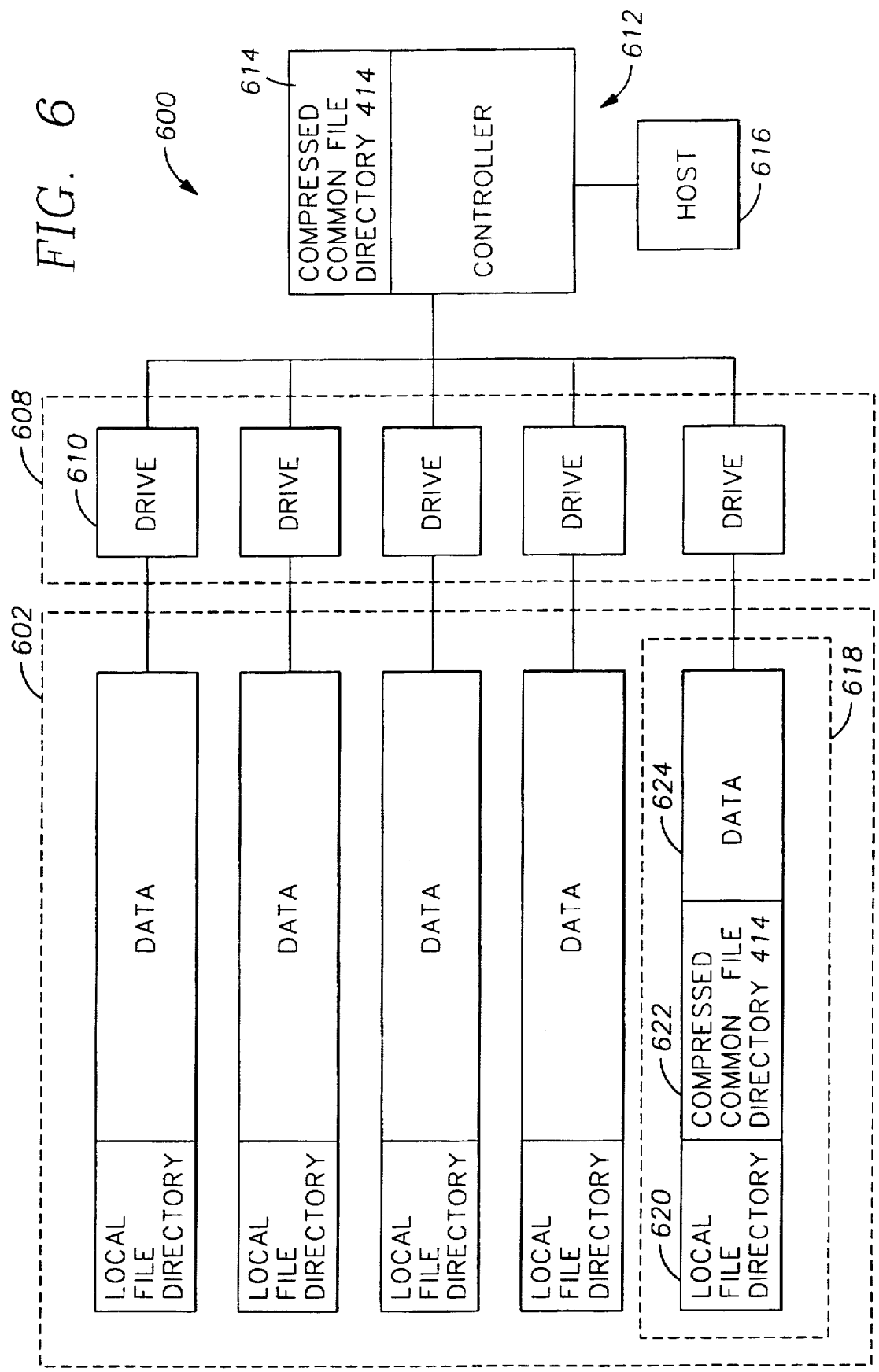
FIG. 6 is a block diagram of a second embodiment of storage system pursuant to the invention, where a controller has indirect initial access to a stored CCFD.

FIG. 6 depicts a second embodiment of hardware environment, as an alternative to FIG. 4. In this embodiment, a storage system 600 includes multiple pieces of media 602 contained in a storage library. As in the storage system 400, each piece of media 602 includes a local file directory, providing a list of files stored on the piece of media, cross-referenced to the files' addresses on the piece of media.

The system 600 includes multiple parallel drives 608, each corresponding to a specific piece of media 602. Unlike FIG. 4, however, a conveyor is not needed since each piece of media includes its own reader. Each drive 608 is coupled to a controller 612, which generally serves to receive read/write requests from a host 616, and execute the requests upon the media 602. More specifically, the controller 612 manages the reading/writing of data to/from the media 602 by the drive 608.

The controller 612 includes a storage device 614 to store the CCFD 414. Preferably, the device 614 comprises a fast access device with high I/O speed, such as RAM. The CCFD 414 is additionally contained in a storage location 622 of a selected piece (or pieces) of media 618. Like the other items of media 602, the piece of media 618 also includes a local file directory (stored in a location 620), and various data (stored in a location 624).

Generally, the storage system 600 operates similarly to the system 400 (FIG. 4). However, the CCFD 414 is preferably copied from the piece of media 618 into the storage device 614 during system initialization. Therefore, the storage device 614 may comprise relatively inexpensive volatile storage such as RAM. Also, storing the CCFD 414 in RAM speeds the controller's access to information contained in the CCFD 414.

OPERATION

Figure 7:
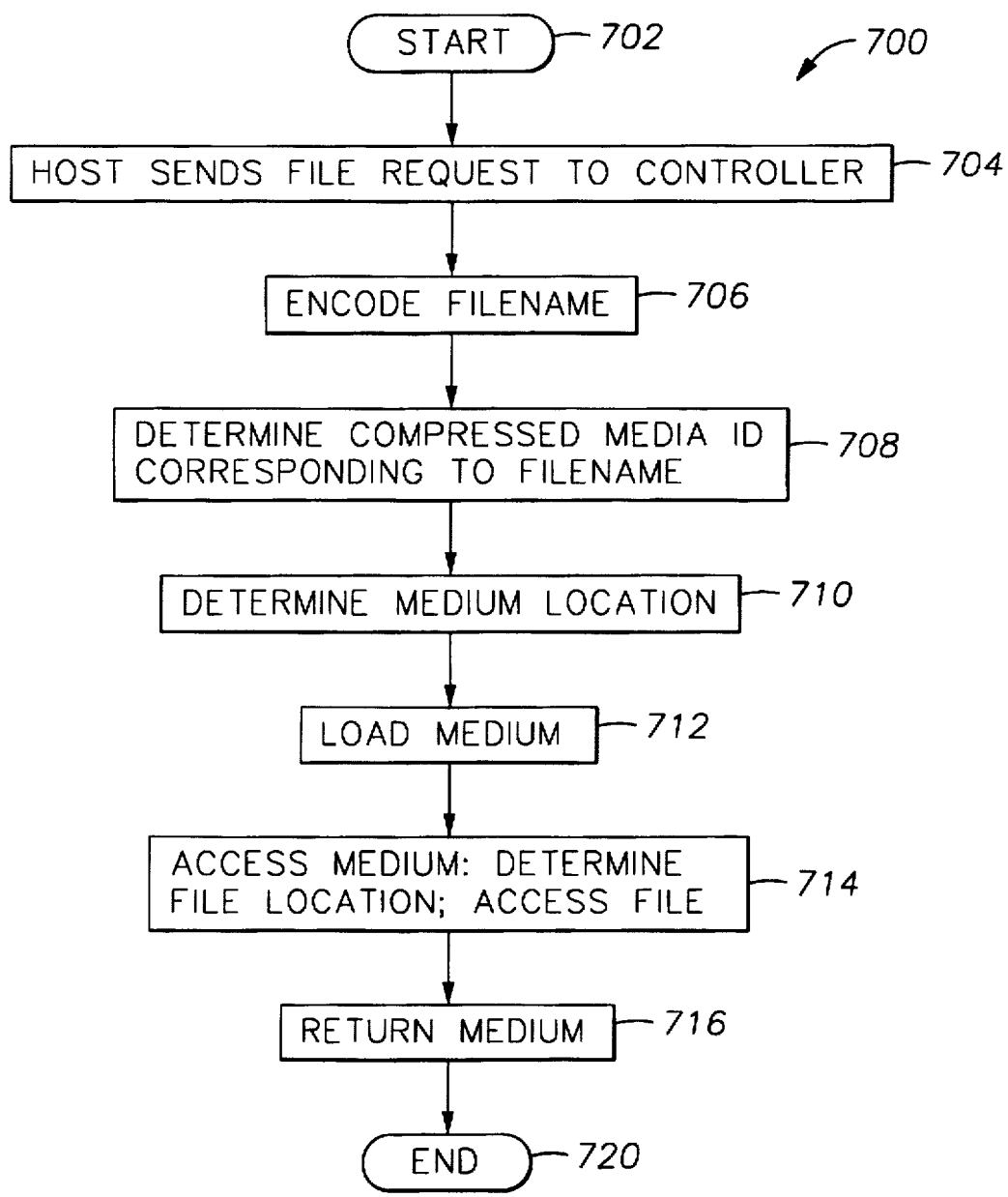
FIG. 7 is a flowchart depicting an exemplary sequence of steps for operating the storage system of FIG. 4, pursuant to the invention.

In addition to the various apparatuses exemplified by the hardware components and interconnections discussed above, the present invention contemplates various methods of file management in a mass storage system. FIG. 7, for example, depicts a sequence of steps 700 for operating the storage system 400 (FIG. 4). The sequence 700 describes the process performed by the storage system 400 each time the host 411 initiates access to the library of media 402. Specifically, in task 704 the host 411 sends a file request to the controller 410. The file request constitutes a request to read or write data to/from a file stored in one of the pieces of media 402. The host 411 may identify the desired file, for example, by its filename. Next, in task 706 the controller 410 encodes the filename by applying a predetermined encoding routine to the filename. Preferably, the predetermined encoding routine comprises an application of CRC, or another encoding scheme to provide encoded filenames, each being unique with respect to the other encoded filenames. In task 708, the controller 410 applies the encoded filename (from task 706) to the data structure 500 to identify a compressed media ID corresponding to the encoded filename. In this respect, the data structure 500 may operate as a lookup table, where each entry of the compressed-media-IDs-by-filename column 503 corresponds to an entry of the encoded-filenames column 502 of the same row.

Having identified the compressed media ID for the desired file, the controller 410 in task 710 determines the location of the piece of media 402 identified by the compressed media ID. Specifically, the controller 410 access the data structure 501, which is part of the CCFD 414 contained in the storage device 412. In particular, the controller 410 cross-references the compressed media ID (obtained in task 708) within the data structure 501 to identify the corresponding entry of the media-location-identifiers column 505. The entries of the media-location-identifiers column 505 may comprise, for example, numeric or alphanumeric designators used by mass storage libraries to refer to their media items.

Having the media location identifier, the controller 410 in task 712 directs the conveyor to load the identified piece of media to the drive 408. Then, the drive 408 in task 714 accesses the loaded item of media, and accesses the medium's local file directory to determine the address of the desired file. Having this address, the drive 408 then reads the file. After task 714, the conveyor returns the medium the library in task 716. Finally, the routine 700 ends in task 720.

Figure 8:
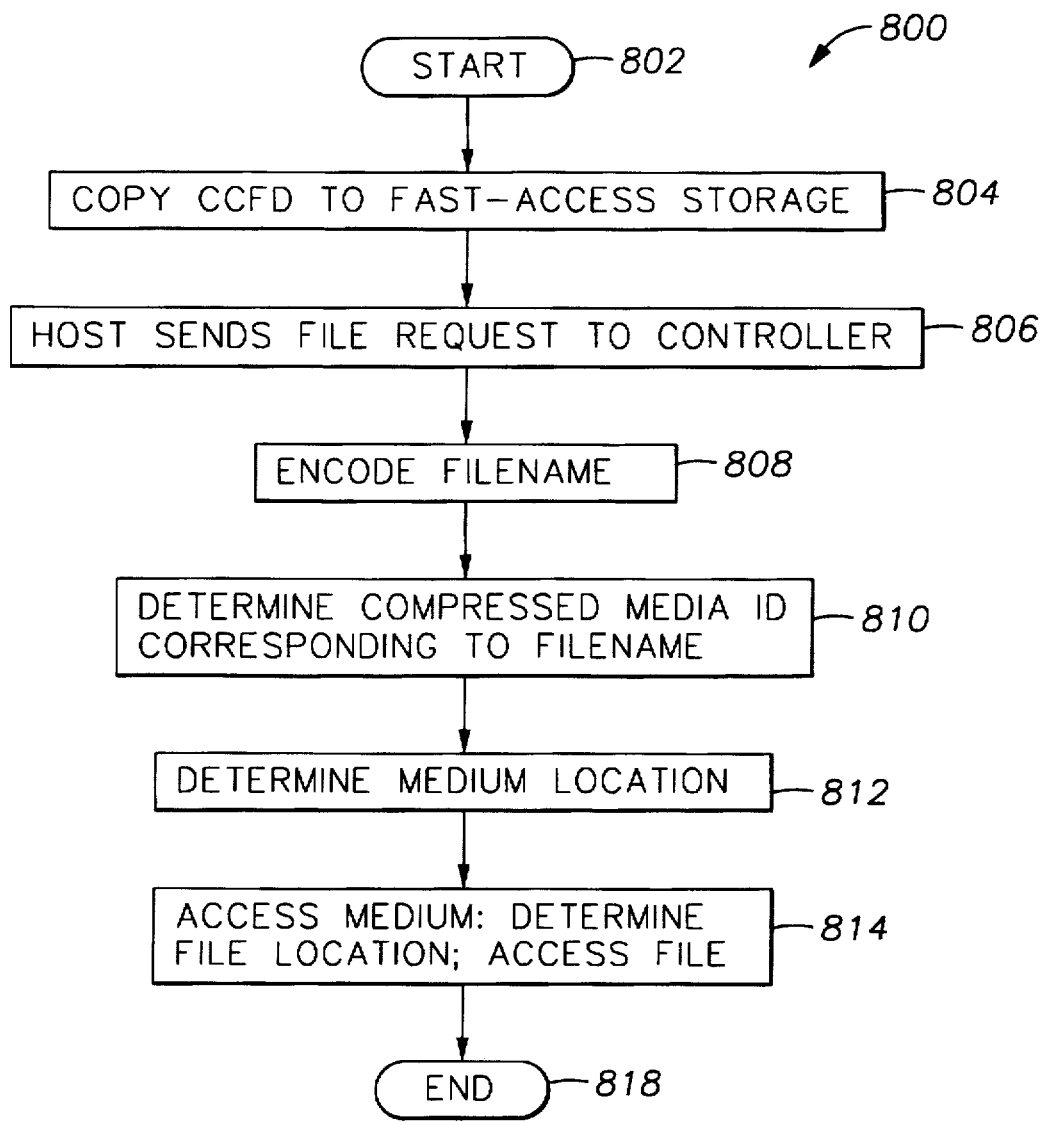
FIG. 8 is a flowchart depicting an exemplary sequence of steps for operating the storage system of FIG. 6, pursuant to the invention.

In contrast to FIG. 7, FIG. 8 depicts a sequence 800 that may be used to manage operations of the storage system 600 (FIG. 6). In task 802, the system 600 is initialized. This may involve powering the system 600 up, or re-booting the system 600, for example.

Soon after system initialization, task 804 copies the CCFD 414 from the location 622 to the storage device 614. As mentioned above, the storage device 614 preferably comprises fast-access memory such as RAM; accordingly, loading the CCFD 414 into the storage device 614 provides the system 600 with extremely fast access to the CCFD 414. Next, tasks 806, 808, 810, and 812 are performed in a similar manner to corresponding tasks 704, 706, 708, and 710 of FIG. 7. However, task 814 differs from tasks 714 and 716, because no media loading is required in the system 600. Because the system 600 includes multiple drives 608, task 814 simply involves reading the local file directory of the piece of media identified in task 812 to locate the desired file, and then reading that file. The routine 800 ends in task 818.

Figure 9:
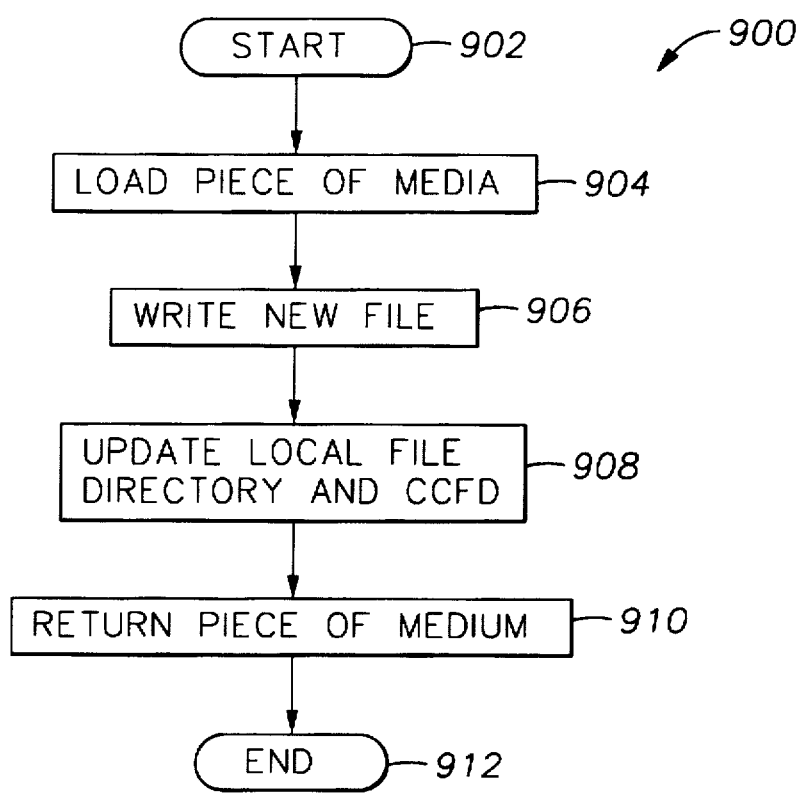
FIG. 9 is a flowchart depicting an exemplary sequence for writing files.

FIG. 9 describes an exemplary sequence 900 for writing files to the media 402. In this illustrated embodiment, the entire library is defined as a single volume. Furthermore, this description is made, for illustrative purposes, using the storage system 400 (FIG. 4). After the routine begins in task 902, the controller 410 locates a piece of media having available storage space and the conveyor loads it to the drive 408. Next, the drive 408 writes the new file to the selected piece of media in task 906. After task 906, the controller 410 in task 908 updates the local file directory of the loaded piece of media, as well as the CCFD 414. Specifically, the drive 408 corrects the local file directory of the piece of media to reflect storage of the new file. Likewise, the drive 408 in task 908 updates the CCFD 414 to reflect storage of the new file. After task 908, the conveyor in task 910 returns the loaded piece of media to the library. Finally, the routine 900 ends in task 912.

Alternatively, each piece of media may be defined as a separate sub-volume. In this embodiment, task 904 additionally involves the steps of using the CCFD 414 to search for the sub-volume address of a desired piece of media. In this respect, an advantageous file management scheme is disclosed in U.S. patent application Ser. No. 08/511,564, entitled "Sub-Volume With Floating Storage Space," filed on Aug. 3, 1995 in the names of C. H. Dang, et al., which is hereby incorporated by reference in its entirety.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A compressed common file directory for use in a mass storage system that includes a plurality of physically separate media items, each media item being associated with a media ID and a media location identifier, said common file directory comprising:

a first data structure comprising a list of unique encoded filenames and a list of compressed media IDs, wherein each particular encoded filename comprises a filename of a particular file residing on at least one of the media items and encoded with a selected encoding scheme, and wherein each particular encoded filename is cross-referenced to a compressed media ID comprising a media ID encoded with a selected encoding scheme, said media ID uniquely identifying the particular media item containing the particular file; and a second data structure including a list of all compressed media IDs, wherein each particular compressed media ID comprises a media ID of a particular item of the plurality of media items encoded with a selected encoding scheme, and wherein each particular compressed media ID is cross-referenced to a media location identifier indicating a location of the particular media item in the mass storage system.

2. The file directory of claim 1, wherein the first and second data structures are stored in a controller associated with the plurality of media items.

3. The file directory of claim 1, wherein the first and second data structures are stored on at least one of the plurality of media items.

4. The file directory of claim 3, wherein the first and second data structures are additionally stored in random access memory accessible by the controller.

5. The file directory of claim 1, wherein every one of the selected encoding schemes comprises cyclic redundancy coding.

6. The file directory of claim 1, wherein the first and second data structures comprise a single lookup table.

7. The file directory of claim 1, wherein the first and second data structures comprise two lookup tables.

8. The file directory of claim 1, wherein each media item contains a local file directory containing a list of files stored on that media item, where each file is cross-referenced to its memory address on that media item.

9. The file directory of claim 1, further comprising a buffer to store changes occurring to the first and second data structure.

10. The file directory of claim 1, further comprising a buffer to store changes occurring to the first and second data structure.

11. A file storage system, comprising:

a library housing containing a plurality of physically unattached media items;

a shared storage drive selectively connectable to the media items;

a controller coupled to the storage drive; and a memory device, containing a compressed common file directory, comprising:

a first data structure comprising a list of unique encoded filenames and a list of compressed media IDs, wherein each particular encoded filename comprises a filename of a particular file residing on at least one of the media items and encoded with a selected encoding scheme, and wherein each particular encoded filename is cross-referenced to a compressed media ID comprising a media ID encoded with a selected encoding scheme, said media ID uniquely identifying the particular media item containing the particular file; and a second data structure including a list of all compressed media IDs, wherein each particular compressed media ID comprises a media ID of a particular item of the plurality of media items encoded with a selected encoding scheme, and wherein each particular compressed media ID is cross-referenced to a media location identifier identifying a physical location of the particular media item with in the library.

12. The file storage system of claim 11, wherein the memory device comprises a magnetic data storage disks.

13. The file storage system of claim 11, wherein the memory device comprises a random access memory circuit.

14. The file storage system of claim 11, wherein the media items comprise optical packages.

15. The file storage system of claim 11, wherein the media items comprise magnetic data storage disks.

16. A file storage system, comprising:

a housing containing a plurality of separately movable media items;

a plurality of storage drives each coupled to at least one of the media items;

a controller coupled to the storage drive; and a memory device, containing a compressed common file directory, comprising:

a first data structure comprising a list of unique encoded filenames and a list of compressed media IDs, wherein each particular encoded filename comprises a filename of a particular file residing on at least one of the media items and encoded with a selected encoding scheme, and wherein each particular encoded filename is cross-referenced to a compressed media ID comprising a media ID encoded with a selected encoding scheme, said media ID uniquely identifying the particular media item containing the particular file; and a second data structure including a list of all compressed media IDs, wherein each particular compressed media ID comprises a media ID of a particular item of the plurality of media items encoded with a selected encoding scheme, and wherein each particular compressed media ID is cross-referenced to a media location identifier indicating a physical location of the particular media item within the housing.

17. The file storage system of claim 16, further including a buffer to store changes occurring to the compressed common file directory.

18. The file storage system of claim 16, wherein the memory device comprises a magnetic data storage disks.

19. The file storage system of claim 16, wherein the memory device comprises a random access memory circuit.

20. The file storage system of claim 16, wherein the media items comprise optical packages.

21. The file storage system of claim 16, wherein the media items comprise magnetic data storage disks.

22. A method of accessing files contained in a mass storage system that includes a plurality of physically separate media items arranged in a library, each media item having a physical location within the library uniquely identified by a media location identifier, wherein the media items contain multiple files each file associated with a unique filename, said method comprising the steps of:

receiving a request for access to a desired file, at least part of which resides on a first one of the media items;

encoding the desired file's filename with a predetermined encoding scheme to provide a first encoded filename;

cross-referencing the first encoded filename in a data structure to obtain a first media location identifier corresponding to the first media item, said cross-referencing step including:

cross-referencing the first encoded filename in a first data structure to obtain a first compressed media ID corresponding to the first media item, wherein said first compressed media ID comprises an abbreviated code uniquely identifying the first media item; and cross-referencing the compressed media ID in a second data structure to obtain a first media location identifier corresponding to the first media item, said media location identifier indications a physical position of the first media item in the library;

using the first media location identifier to locate the first media item in the library, and coupling the first media item to a storage drive;

reading a first local file directory contained on the first media item to identify an address at which the desired file resides on the first media item; and reading the desired file by reading data beginning from the address of the first media item.

23. The method of claim 22, wherein each compressed media ID comprises an encoding of a media ID uniquely identifying the first media item.

24. The method of claim 23, wherein the encoding of media IDs comprises cyclic redundancy coding.

25. The method of claim 22, wherein the encoding step comprises the steps of applying cyclic redundancy coding to the filename.

26. The method of claim 22, wherein the request includes the desired file's filename.

27. The method of claim 22, wherein the first data structure comprises a listing of encoded filenames each linked to a corresponding compressed media ID that comprises an abbreviated code uniquely identifying media items where files identified by the filenames reside.

28. The method of claim 22, wherein the second data structure comprises a listing of compressed media IDs linked to corresponding media location identifiers.

29. The method of claim 22, further comprising the steps of changing the data structure in response to changes in storage of the files of the mass storage system.

30. The method of claim 29, wherein the changes include deletion of a file.

31. The method of claim 29, wherein the changes include addition of a file.

32. The method of claim 22, further comprising the steps of:

generating and storing updates to the data structure to reflect changes in storage of the files of the mass storage system; and at selected times revising the data structure to reflect the stored updates.

33. The method of claim 32, wherein the changes include deletion of a file.

34. The method of claim 33, wherein the changes include addition of a file.

35. A compressed common file directory for use in a mass storage system that includes a plurality of physically distinct media items, each media item being associated with a media ID and a media location identifier, said common file directory comprising:

a first data structure comprising a list of unique encoded filenames and a list of compressed media IDs, wherein each particular encoded filename comprises a filename of a particular file residing on at least one of the media items and encoded with a selected encoding scheme, and wherein each particular encoded filename is cross-referenced to a compressed media ID comprising a media ID encoded with a selected encoding scheme and associated with the particular media item containing the particular file;

a second data structure including a list of all compressed media IDs, wherein each particular compressed media ID comprises a media ID of a particular item of the plurality of media items encoded with a selected encoding scheme, and wherein each particular compressed media ID is cross-referenced to a media location identifier indicating a physical position of the particular media item within the mass storage system; and a third data structure including a list of unencoded filenames and a list of unencoded media codes, wherein each filename is associated with a file contained on a particular item of media, and wherein each particular filename is cross-referenced to a particular media code that identifies the particular media item containing the file, wherein the third data structure is stored on at least one of the media items.

36. A file storage system, comprising:

a housings containing a plurality of physically unattached media items;

a shared storage drive selectively connectable to the media items;

a controller coupled to the storage drive;

a memory device, containing a compressed common file directory, comprising:

a first data structure comprising a list of unique encoded filenames and a list of compressed media IDs, wherein each particular encoded filename comprises a filename of a particular file residing on at least one of the media items and encoded with a selected encoding scheme, and wherein each particular encoded filename is cross-referenced to a compressed media ID comprising a media ID encoded with a selected encoding scheme and associated with the particular media item containing the particular file; and a second data structure including a list of all compressed media IDs, wherein each particular compressed media ID comprises a media ID of a particular item of the plurality of media items encoded with a selected encoding scheme, and wherein each particular compressed media ID is cross-referenced to a media location identifier indicating a physical position of the particular media item within the housing; and a buffer to store changes occurring to the compressed common file directory.

* * * * *